United States Patent [19]
Berta

[11] Patent Number: 4,672,091
[45] Date of Patent: Jun. 9, 1987

[54] THERMOPLASTIC ELASTOMER BLENDS CONTAINING ETHYLENE-PROPYLENE THERMOPLASTIC BLOCK COPOLYMER ELASTOMERS

[75] Inventor: Dominic A. Berta, New Castle County, Del.

[73] Assignee: Hercules Incorporated, Wilmington, Del.

[21] Appl. No.: 800,575

[22] Filed: Nov. 21, 1985

Related U.S. Application Data

[63] Continuation of Ser. No. 667,710, Nov. 2, 1984, abandoned.

[51] Int. Cl.$^4$ ................................................ C08L 53/00
[52] U.S. Cl. ........................................ 525/88; 525/89
[58] Field of Search ................ 525/88, 89, 240, 241, 525/283, 321, 323

[56] References Cited

U.S. PATENT DOCUMENTS

| T995,009 | 2/1977 | Gregor et al. | 357/80 |
|---|---|---|---|
| 3,527,844 | 9/1970 | Hull | 525/323 |
| 3,627,852 | 12/1971 | Aishima | 525/323 |
| 3,632,674 | 1/1972 | Aishima | 525/323 |
| 3,634,546 | 1/1972 | Hagemeyer, Jr. | 525/323 |
| 3,652,725 | 3/1972 | Diaz | 525/323 |
| 3,894,117 | 7/1975 | Agouri | 525/323 |
| 3,906,056 | 9/1975 | Okamoto | 525/88 |
| 3,917,746 | 11/1975 | Aishima | 525/323 |
| 3,937,758 | 2/1976 | Castagna | 525/323 |
| 4,312,964 | 1/1982 | Sekine | 525/240 |
| 4,412,016 | 10/1983 | Fukui | 525/206 |
| 4,413,097 | 11/1983 | Matsuura | 525/240 |
| 4,510,031 | 4/1985 | Matsumura | 525/240 |
| 4,526,931 | 7/1985 | Chiba | 525/268 |

FOREIGN PATENT DOCUMENTS 53-005245  1/1978  Japan.
142810  1/1983  Japan.

Primary Examiner—Christopher Henderson
Attorney, Agent, or Firm—Marion C. Staves; William E. Player

[57] ABSTRACT

Disclosed are stabilized blends comprising (1) from about 55% to about 90% of at least one high molecular weight $C_2$–$C_3$ block copolymer elastomer, (2) from about 10% to about 35% of at least one compatible low molecular weight resin, and (3) from 0% to about 15% of at least one incompatible resin, the total of (1), (2) and (3) being 100%. The blends are elastomers useful in industrial hose applications and in mechanical rubber goods, such as gaskets and mounts.

7 Claims, No Drawings

THERMOPLASTIC ELASTOMER BLENDS CONTAINING ETHYLENE-PROPYLENE THERMOPLASTIC BLOCK COPOLYMER ELASTOMERS

This application is a continuation of application Ser. No. 667,710 filed Nov. 2, 1984 now abandoned.

This invention relates to stabilized blends of high molecular weight ethylene-propylene ($C_2$–$C_3$) thermoplastic block copolymer elastomers, low molecular weight resins compatible with the $C_2$–$C_3$ block copolymers, and, optionally, hard resins incompatible with the $C_2$–$C_3$ block copolymers having improved processibility while maintaining good physical, elastic, and compression set properties. The blends are elastomers useful in industrial hose applications and in mechanical rubber goods, such as gaskets and mounts.

Thermoplastic elastomers behave like crosslinked elastomers at the temperature at which they are generally used, i.e., below 150° C., yet they can be molded and processed like thermoplastics above 150° C. Thermoplastic elastomers which are block copolymers of ethylene and propylene having a very high molecular weight and, therefore, an intrinsic viscosity of greater than 6 dl/gm as measured by determining the specific viscosity at 135° C. and dividing the specific viscosity by the concentration of a 0.1% solution of the copolymers in decalin. Such elastomers are difficult and impractical to process on conventional plastic and rubber compounding and processing equipment.

As a practical matter, the use of hydrogen as described in U.S. Pat. No. 3,051,690 to control the molecular weight of the resultant thermoplastic elastomer is not possible in view of the polymerization process used to prepare these $C_2$–$C_3$ block copolymer elastomers. The resultant polymer can, of course, be made more processable by degradation, but not without a detrimental effect on the physical and elastic properties of the elastomer.

In order for these $C_2$–$C_3$ block copolymer elastomers to be useful, the elastomer is compounded with conventional stabilizers to prevent degradation during fluxing and molded into parts, usually by injection molding. The compounding of the elastomer with stabilizers is characterized by long flux or homogenization times (30 min.) or low melt flow ($I_{10}$ at 230° C. 0.1 dg/min.), or both.

This invention provides an antioxidant-containing blend comprising (1) from about 55% to about 90% of at least one high molecular weight $C_2$–$C_3$ block copolymer elastomer, (2) from about 10% to about 35% of at least one compatible low molecular weight resin, and (3) from 0% to about 15% of at least one incompatible resin, the total of (1), (2) and (3) being 100%. The time it takes to homogenize the blend is reduced significantly. In addition, the blend has improved processibility and good physical, elastic and compression set properties.

As used in this specification, "compatible" means resins, including oligomers, that can be easily and quickly fluxed or blended with the high molecular weight $C_2$–$C_3$ block copolymer elastomers to form a homogeneous blend which has little evidence of phase separation, but is not necessarily completely clear in the melt or solid phase.

"Incompatible" as used herein means resins, including oligomers, that take a relatively longer time to flux or blend with the high molecular weight $C_2$–$C_3$ block copolymer elastomers, and that provide blends which do not yield a crystal clear melt phase and show evidence of a lubricating effect on flow properties in that they impart a slippery character to the blend. This slippery character is especially noticeable when extruding the melt through a die.

All parts and percentages used in this specification are by weight unless otherwise specified.

The $C_2$–$C_3$ block copolymer elastomer has the general formula: A-(B-A)x wherein A is a predominantly crystalline polypropylene block; B is a predominantly random ethylenepropylene copolymer block; and x is an integer from about 1 to about 15. The $C_2$–$C_3$ block copolymer also contains some polyethylene. Preferably the block copolymer elastomer is present in an amount from about 72% to about 85% in the blend of this invention. Typically the $C_2$–$C_3$ block copolymer elastomer has a crystalline polypropylene content of from about 5% to about 25%, preferably from about 10% to about 20% and a propylene content of from about 50% to about 70%, preferably from about 55% to about 65%. Suitable $C_2$–$C_3$ block copolymer elastomers are set forth in U.S. Pat. No. 4,408,019 to H. W. Blunt. Typically, the $C_2$–$C_3$ block copolymer elastomers have an intrinsic viscosity from about 6 to about 16 dl/gm.

The compatible resins are those resins, including oligmers, having a melt flow of at least 5 dg/min. (ASTM D-1238-70), preferably greater than 25 dg/min., and most preferably greater than 100 dg/min. The compatible resins are essentially aliphatic, preferably having an aliphatic content of at least 95%. Preferably the compatible resins have a number average molecular weight from about 350 to about 2000 as measured by a size exclusion chromatography (SEC) column. Typical compatible resins include homopolymers of propylene, copolymers of propylene with another alpha-olefin monomers, terpolymers of propylene with other alpha-olefin monomers, hydrocarbon resins, ethylene homopolymers and mixtures thereof.

When a homopolymer of propylene is used as the compatible resin, it usually has a crystallinity from about 30% to about 60%, preferably about 50% to about 60%. When copolymers and terpolymers of propylene with other alpha-olefin monomers are used, the crystallinity is generally from about 30% to about 60% and the propylene content is usually greater than about 30%. Suitable alpha-olefins monomers which can be copolymerized with propylene include ethylene and butene-1. The copolymers can be random or block copolymers. Mixtures of homopolymers, copolymers and terpolymers may also be used. Blends of propylene homopolymer, ethylene homopolymer and random copolymers of propylene and ethylene prepared by sequentially polymerizing propylene and ethylene having a crystallinity of from about 30% to about 60% can also be used as the compatible resin.

Hydrocarbon resins, such as terpene resins, polymers of styrene and styrene derivatives which are essentially completely hydrogenated, i.e., from about 90% to about 98%, and copolymers thereof with each other and with other unsaturated monomers also can be used as the compatible resin. Generally, blends of these resins with the $C_2$–$C_3$ block copolymer elastomers are relatively clear melt blends. Typical hydrocarbon resins are described in U.S. Pat. No. 4,032,493.

Typical styrene derivatives include alpha-methyl styrene, para-methyl styrene and vinyl toluene. Vinyl toluene, as used herein, means the vinyl toluene mixture commercially available. Such vinyl toluene mixture comprises a mixture of approximately 65% of the meta isomer and 35% of the para isomer.

Suitable ethylene homopolymers include those having a number average molecular weight from about 350 to about 2000 as measured by SEC.

Preferably, the compatible resin is present in an amount from about 15% to about 30%, most preferably about 15% to about 25%. The preferred compatible resins are essentially completely hydrogenated polymers of alpha-methyl styrene and vinyl toluene and copolymers thereof, and low molecular weight polyolefins, such as polyethylene and polypropylene.

Any incompatible resins, including oligomers, having greater than 30% aromatic character may be used to further enhance the flow of the binary blends of this invention. Typical incompatible resins include homopolymers, copolymers and terpolymers of styrene or its derivatives, such as, alpha-methyl-styrene, para-methyl-styrene, vinyl toluene and t-butylstyrene. Copolymers and terpolymers of styrene or its derivatives with non-aromatic monomers, such as terpenes, may be used provided the aromatic character is greater than 30%. Generally the aromatic content of the incompatible resin is greater than 30% to about 99%, preferably from about 60% to about 98%.

Ternary blends of the $C_2$-$C_3$ block copolymer elastomer, the compatible resin and the incompatible resin are not crystal clear as a rule.

When the incompatible resin is present, it is present in an amount from about 1% to about 15%, preferably in an amount from about 2% to about 10%, most preferably from about 3% to about 8%. Hence, an antioxidant-containing ternary blend of this invention comprises from about 55% to about 90% of at least one high molecular weight $C_2$-$C_3$ block copolymer elastomer, from about 10% to about 35% of at least one compatible low molecular weight resin and from 1% to about 15% of at least one incompatible resin.

Other conventional additives can be added to the binary and ternary blends of this invention, such as antioxidants, fillers, extenders, pigments, plasticizers, softeners, processing oils, processing aids, and nucleators. Rubbers, such as ethylene-propylene and ethylene-propylene-diene monomer rubbers, and polyisobutylene may also be added as process aids.

Any level of antioxidant which provides stability during blending and fabrication and on aging may be used. Generally from greater than 0.2% by weight of the polymeric content (i.e. elastomer and resin content) of the blend to about 1.0%. Suitable antioxidants include hindered phenolic compounds such as tetrakis[methylene 3-(3',5'-ditert-butyl-4'hydroxyphenyl propionate]methane, phosphite compounds such as trinonylphenyl phosphite, or combinations of both. A combination of the two antioxidants is preferred.

The blends of this invention are prepared by placing all the ingredients in a suitable container and manually stirring to pre-blend the ingredients, adding the pre-blended ingredients to a Brabender plastograph internal mixer having roller or cam type mixing heads and a jacket heated to a temperature of 400° F. The temperature is maintained at 400° F. during the blending. The rotors are turned at 60 rpm and the ingredients are mixed until blended (about 5 min.). The blend is then mixed an additional 5 minutes to insure homogeneity. A metal ram is used to lightly force the material into the chamber when necessary. The homogeneous blend is then removed from the mixer, placed in a pan and sheeted out on a hot (340° F.) differential speed, two-roll mill. The sheet material is then compression molded into 80 mil thick plaques by heating for 3 min. at 430° F. under 15 tons pressure.

The controls are prepared by the same procedure as set forth above except that the temperature of the jacket of the Brabender mixer is increased as indicated herein.

Although a Brabender mixer is used to prepare the blends of this invention as illustrated in the examples, they may also be prepared by any mixer that will provide a homogeneous blend of the ingredients in a short mixing time period.

EXAMPLES 1-5

These examples, prepared as set forth above, illustrate various embodiments of stabilized binary blends of this invention.

The ingredients and properties of examples 1-5 and of controls 1-2 are set forth in Table I below.

TABLE I

| Ingredients, % | Examples | | | | | Controls | |
|---|---|---|---|---|---|---|---|
| | 1 | 2 | 3 | 4 | 5 | 1 | 2 |
| $C_2$-$C_3$ Block copolymer elastomer[a] | 85 | 85 | 85 | 85 | 75 | 100 | 100 |
| Polypropylene, 60% crystalline | 15 | — | — | — | — | — | — |
| Hydrogenated (98%) alpha-methyl styrene/vinyl-toluene copolymer, 1000 mol. wt. | — | 15 | — | — | — | — | — |
| Polyethylene wax, 500 mol. wt. | — | — | 15 | — | 25 | — | — |
| Propylene-butene 1 copolymer, 50% crystalline | — | — | — | 15 | — | — | — |
| Tetrakis[methylene 3-(3',5'-di-tertbutyl-4'hydroxyphenyl propionate]methane[b] | 0.4 | 0.4 | 0.4 | 0.4 | 0.4 | 0.4 | 0.4 |
| Trinonylphenyl phosphite[b] | 0.4 | 0.4 | 0.4 | 0.4 | 0.4 | 0.4 | 0.4 |
| Flux time, min. | 9 | 5 | 8 | 7 | 4 | 46 | 15 |
| Flux temp., °F. | 400 | 400 | 400 | 400 | 400 | 400 | 515 |
| Final torque, lbf-in | 1330 | 1650 | 1200 | 1190 | 920 | 1980 | 600 |
| Physical Properties[c] | | | | | | | |
| 100% Modulus, psi. | 870 | 530 | 590 | 800 | 590 | 580 | 420 |

TABLE I-continued

| Ingredients, % | Examples | | | | | Controls | |
|---|---|---|---|---|---|---|---|
| | 1 | 2 | 3 | 4 | 5 | 1 | 2 |
| 200% Modulus, psi. | 960 | 560 | 600 | 890 | 600 | 700 | 450 |
| Tensile Strength, psi. | 2200 | 2130 | 1400 | 2190 | 1330 | 1690 | 510 |
| % Elongation | 690 | 720 | 860 | 720 | 860 | 620 | 420 |
| Shore A Hardness | 92 | 82 | 90 | 92 | 90 | 84 | 76 |
| Compression Set[d] | | | | | | | |
| 73° F./22 hr. | 29 | 17 | 38 | 31 | 43 | 18 | 40 |
| 158° F./22 hr. | 68 | 56 | 65 | 73 | 68 | 49 | 82 |
| $I_{10}$ at 230° C., dg/min.[e] | 1.2 | 0.6 | 2.1 | 1.1 | 6.2 | 0.02 | 15 |

[a]About 10% crystalline polypropylene and about 55% total $C_3$ content with an intrinsic viscosity of about 12.
[b]By weight of the polymeric content of the blend, i.e. by weight of the first five ingredients.
[c]ASTM D-412.
[d]ASTM D-395B.
[e]ASTM D-1238-70.

Control 1 shows that a suitability stabilized $C_2$–$C_3$ block copolymer elastomer has to be fluxed or homogenized for long mixing times to degrade the elastomer to the point that it is processable. However, the resultant material has a very low melt flow. Such a low melt flow makes it impractical to process the material in conventional injection and extrusion molding equipment. In order for the material to be processable in conventional injection and extrusion equipment it needs a melt flow ($I_{10}$) at 230° C. of greater than 0.5 dg/min.

Control 2 shows that higher flux temperatures reduces the flux time and provides a material having a reasonably high melt flow but the tensile strength and compression set properties of the material are adversely affected.

Examples 1–5 show that the binary blends of this invention have significantly improved processibility as evidenced by the lower torque and flux times while at the same time maintaining good physical and elastic properties.

EXAMPLES 6–12

These examples, prepared as set forth herein, illustrate various embodiments of the stabilized ternary blends of this invention.

The ingredients and properties of examples 6–12 and of controls 3–6 are set forth in Table II below.

TABLE II

| Ingredients, Parts | Examples | | | | | | | Controls | | | |
|---|---|---|---|---|---|---|---|---|---|---|---|
| | 6 | 7 | 8 | 9 | 10 | 11 | 12 | 3 | 4 | 5 | 6 |
| $C_2$–$C_3$ block copolymer elastomer[a] | — | — | — | — | 80 | — | 81 | 90 | 80 | — | — |
| $C_2$–$C_3$ block copolymer elastomer[b] | 74 | 72 | 60 | 55 | — | 80 | — | — | — | 100 | 50 |
| Propylene-butene-1 copolymer, 50% crystalline | — | — | — | — | 20 | 20 | 14 | — | — | — | — |
| Olefin polymer blend[c] | 24 | 18 | 25 | 30 | — | — | — | — | — | — | 30 |
| Alpha-methyl styrene-vinyl toluene copolymer, 99% aromatic | 2 | 10 | 15 | 15 | 2 | 2 | 5 | 10 | 20 | — | 20 |
| Tetrakis [methylene 3-(3',5'-di-tertbutyl-4'hydroxyphenyl propionate] methane[d] | 0.4 | 0.4 | 0.4 | 0.4 | 0.4 | 0.4 | 0.4 | 0.4 | 0.4 | 0.4 | 0.4 |
| Trisnonylphenyl phosphite[d] | 0.4 | 0.4 | 0.4 | 0.4 | 0.4 | 0.4 | 0.4 | 0.4 | 0.4 | 0.4 | 0.4 |
| Flux time, min. | 0.75 | 5.0 | 13.5 | 17.0 | 1.2 | 0.5 | 2.5 | 30 | 30 | 11 | 30 |
| Flux temp., °F. | 400 | 400 | 400 | 400 | 400 | 400 | 400 | 400 | 400 | 400 | 400 |
| Final torque, lbf-in. | 1550 | 1400 | 1100 | 1000 | 1300 | 1400 | 1500 | 2000 | 2000 | 2250 | 500 |
| Physical Properties[e] | | | | | | | | | | | |
| 100% Modulus, psi. | 1830 | 1820 | 1570 | 1300 | 720 | 1420 | 708 | 400 | * | 1570 | * |
| 200% Modulus, psi. | 1880 | 1860 | 1580 | 1380 | 1810 | 1500 | 795 | — | * | 1810 | * |
| Tensile Strength, psi | 2200 | 2040 | 1630 | 1380 | 1860 | 2360 | 1794 | 460 | * | 1930 | * |
| % Elongation | 530 | 420 | 360 | 200 | 690 | 580 | 691 | 100 | * | 240 | * |
| Shore A Hardness | 97 | 98 | 98 | 98 | 91 | 94 | 90 | 85 | * | 95 | * |
| % Compression Set[f] | | | | | | | | | | | |
| 73° F./22 hr. | 41 | 40 | 50 | 50 | 33 | 42 | 49 | 46 | * | 31 | * |
| 158° F./22 hr. | 57 | 56 | 75 | 76 | 63 | 61 | 74 | 73 | * | 54 | * |
| $I_{10}$ at 230° C., dg/min.[g] | 1.0 | 5.1 | 14 | 18 | 1.9 | 0.6 | 7.3 | 2.7 | * | 0.02 | * |

*Too inhomogeneous to test.
[a]About 10% crystalline polypropylene and about 55% total $C_3$ content with an intrinsic viscosity of about 12.
[b]About 25% crystalline polypropylene and about 70% total $C_3$ content with an intrinsic viscosity of about 12.
[c]Blend of propylene homopolymer, ethylene homopolymer and random copolymers of propylene and ethylene having a polypropylene crystallinity of 39%.
[d]Parts by weight of the polymeric content of the blend, i.e. by weight of the first eight ingredients listed.
[e]ASTM D-412.
[f]ASTM D-395B.
[g]ASTM D-1238-70.

Controls 3 and 4 show that blends of the $C_2$–$C_3$ block copolymer with an incompatible resin are not useful materials in and of themselves since the flux times are too long and the physical properties are poor or immeasurable.

Control 5 shows that a suitably stabilized C$_2$–C$_3$ block copolymer elastomer having a higher crystalline polypropylene block has slightly lower flux times, but has too low a melt flow to be processible in conventional injection and extrusion equipment.

Control 6 shows that too high levels, i.e. about 20%, of an incompatible resin blended with the elastomer and compatible resin provides a material which takes too long to flux and whose physical properties are immeasurable.

Thus, this invention provides suitably stabilizer blends of C$_2$–C$_3$ block copolymer elastomer, a compatible resin, and, optionally, an incompatible resin having significantly reduced flux or homogenization times and significantly improved melt flow so as to render them processable while at the same time maintaining good physical, elastic, and compression set properties.

Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What is claimed:

1. In a composition comprising a stabilized thermoplastic block copolymer elastomer having the general formula A-(B-A)$_x$ wherein A is a predominantly crystalline polypropylene block B is a predominately random ethylene-propylene copolymer block, and x is an integer from 1 to 15, the improvement wherein the composition further comprises from 10% to 35% of at least one compatible resin having a melt flow of at least 5 dg/min and is selected from the group consisting of homopolymers of propylene; copolymers of propylene with another alpha-olefin monomer; terpolymers of propylene with other alpha-olefin monomers; blends of propylene homopolymer; ethylene homopolymer, and random copolymers of propylene and ethylene; essentially completely hydrogenated polymers of styrene; essentially completely hydrogenated polymers of styrene derivatives; essentially completely hydrogenated copolymers of styrene and styrene derivatives; homopolymers of ethylene; and mixtures therof; and (b) from 0% to 15% of an incompatible resin having an aromatic character greater than 30%.

2. The composition of claim 1 wherein the incompatible resin is selected from the group consisting of styrene homopolymers, styrene derivative homopolymers, styrene copolymers, styrene derivative copolymers, styrene terpolymers, and styrene derivative terpolymers.

3. The composition of claim 1 wherein the compatible resin is a homopolymer of propylene.

4. The composition of claim 1 wherein the compatible resin is a copolymer of propylene and butene-1.

5. The composition of claim 1 wherein the compatible resin is a homopolymer of ethylene.

6. The composition of claim 1 wherein the compatible resin is an essentially completely hydrogenated copolymer of a styrene derivative.

7. The composition of claim 1 wherein the compatible resin is present in an amount from 15% to 30%.

* * * * *

UNITED STATES PATENT AND TRADEMARK OFFICE
CERTIFICATE OF CORRECTION

PATENT NO. : 4,672,091

DATED : June 9, 1987

INVENTOR(S) : BERTA

It is certified that error appears in the above-identified patent and that said Letters Patent is hereby corrected as shown below:

Column 8, Line 2; after "comprises"

"(a)" is omitted.

Signed and Sealed this

Seventeenth Day of November, 1987

Attest:

DONALD J. QUIGG

Attesting Officer

Commissioner of Patents and Trademarks